(12) United States Patent
Wang et al.

(10) Patent No.: US 12,127,726 B2
(45) Date of Patent: Oct. 29, 2024

(54) SYSTEM AND METHOD FOR ROBUST IMAGE-QUERY UNDERSTANDING BASED ON CONTEXTUAL FEATURES

(71) Applicant: Samsung Electronics Co., Ltd., Suwon-si (KR)

(72) Inventors: Yu Wang, Bellevue, WA (US); Yilin Shen, Santa Clara, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 17/231,958

(22) Filed: Apr. 15, 2021

(65) Prior Publication Data

US 2021/0342624 A1    Nov. 4, 2021

Related U.S. Application Data

(60) Provisional application No. 63/017,887, filed on Apr. 30, 2020.

(51) Int. Cl.
*G06V 10/70* (2022.01)
*A47L 9/28* (2006.01)
(Continued)

(52) U.S. Cl.
CPC .......... *A47L 9/2805* (2013.01); *A47L 11/40* (2013.01); *G06F 18/214* (2023.01);
(Continued)

(58) Field of Classification Search
CPC .... A47L 9/2805; A47L 9/2847; A47L 9/2852; A47L 9/2857; A47L 2201/06;
(Continued)

(56) References Cited

U.S. PATENT DOCUMENTS 9,965,705 B2    5/2018    Chen et al.
10,565,305 B2    2/2020    Lu et al.
(Continued)

FOREIGN PATENT DOCUMENTS

| CN | 111461004 A | 7/2020 | |
|---|---|---|---|
| KR | 10-2019-0137359 A | 12/2019 | |
| WO | WO-2019183568 A1 * | 9/2019 | ............ B25J 13/08 |

OTHER PUBLICATIONS

Dogan et al, Neural Sequential Phrase Grounding (SeqGROUND), Computer Vision Foundation, pp. 4175-4184. (Year: 2019).*

(Continued)

*Primary Examiner* — Aaron W Carter
*Assistant Examiner* — Kathleen M Broughton

(57) ABSTRACT

A method includes obtaining, using at least one processor of an electronic device, an image-query understanding model. The method also includes obtaining, using the at least one processor, an image and a user query associated with the image, where the image includes a target image area and the user query includes a target phrase. The method further includes retraining, using the at least one processor, the image-query understanding model using a correlation between the target image area and the target phrase to obtain a retrained image-query understanding model.

25 Claims, 9 Drawing Sheets

(51) Int. Cl.
*A47L 11/40* (2006.01)
*G06F 18/214* (2023.01)
*G06V 20/10* (2022.01)

(52) U.S. Cl.
CPC ............ *G06V 10/768* (2022.01); *G06V 20/10* (2022.01); *A47L 2201/06* (2013.01)

(58) Field of Classification Search
CPC .. A47L 2201/04; A47L 11/40; A47L 11/4011; A47L 11/4061; G06F 18/214; G06F 16/3329; G06F 16/583; G06V 10/768; G06V 20/10; G06N 3/0464; G06N 3/0442; G06N 3/0455; G06N 3/091; G06N 3/096
See application file for complete search history.

(56) References Cited

U.S. PATENT DOCUMENTS

| | | | |
|---|---|---|---|
| 10,810,748 B2 | 10/2020 | Gao et al. | |
| 2015/0202771 A1* | 7/2015 | Lee | G05D 1/0094 901/1 |
| 2017/0206465 A1* | 7/2017 | Jin | G06F 16/5866 |
| 2018/0165518 A1* | 6/2018 | Assaf | G05D 1/0246 |
| 2018/0204107 A1 | 7/2018 | Tucker | |
| 2018/0279847 A1* | 10/2018 | Park | A47L 9/2868 |
| 2018/0373242 A1* | 12/2018 | Han | A47L 11/4011 |
| 2019/0121853 A1 | 4/2019 | Cai et al. | |
| 2019/0166980 A1 | 6/2019 | Huang et al. | |
| 2019/0176321 A1* | 6/2019 | Afrouzi | B25J 9/0003 |
| 2019/0258713 A1 | 8/2019 | Kiros et al. | |
| 2019/0362234 A1* | 11/2019 | Maeng | A47L 9/2852 |
| 2020/0005784 A1 | 1/2020 | Vadackupurath Mani et al. | |
| 2020/0019632 A1 | 1/2020 | Larchev et al. | |
| 2020/0058291 A1 | 2/2020 | Wang et al. | |
| 2020/0097604 A1* | 3/2020 | Lee | G06N 3/08 |
| 2020/0193228 A1 | 6/2020 | Lu et al. | |
| 2020/0311798 A1* | 10/2020 | Forsyth | G06Q 30/0631 |
| 2021/0086353 A1* | 3/2021 | Shah | G06V 20/10 |

OTHER PUBLICATIONS

Dogan et al, Neural Sequential Phrase Grounding, 2019, arXiv: 1903.07669v1, pp. 1-11. (Year: 2019).*
Yu et al, Multi-level Attention Networks for Visual Question Answering, 2017, IEEE Conference on Computer Vision and Pattern Recognition, pp. 1-9. (Year: 2017).*
Zhang et al, Knowledge-Based Scene Graphic Generation with Visual Contextual Dependency, 2022, Mathematics 10(2525): pp. 1-20. (Year: 2022).*
Guo et al, Sparse co-attention visual question answering networks based on Thresholds, 2022, Applied Intelligence (2023) 53: 586-600. (Year: 2022).*
International Search Report and Written Opinion of the International Searching Authority dated Aug. 3, 2021 in connection with International Patent Application No. PCT/KR2021/005525, 10 pages.
Choi, "Semantic Video Segmentation and Scene-based Topic Generation of Broadcasting Contents", ETRI Technology, Nov. 2016, 7 pages.
Supplementary European Search Report dated May 10, 2023 in connection with European Patent Application No. 21797272.8, 7 pages.

* cited by examiner

SYSTEM AND METHOD FOR ROBUST IMAGE-QUERY UNDERSTANDING BASED ON CONTEXTUAL FEATURES

CROSS-REFERENCE TO RELATED APPLICATION AND PRIORITY CLAIM

This application claims priority under 35 U.S.C. § 119(e) to U.S. Provisional Patent Application No. 63/017,887 filed on Apr. 30, 2020, which is hereby incorporated by reference in its entirety.

TECHNICAL FIELD

This disclosure relates generally to machine learning systems. More specifically, this disclosure relates to a system and method for robust image-query understanding based on contextual features.

BACKGROUND

Image-Query understanding, including visual question answering (VQA), is a challenging task that requires a deep understanding of language and images.

SUMMARY

This disclosure provides a system and method for robust image-query understanding based on contextual features.

In a first embodiment, a method includes obtaining, using at least one processor of an electronic device, an image-query understanding model. The method also includes obtaining, using the at least one processor, an image and a user query associated with the image, where the image includes a target image area and the user query includes a target phrase. The method further includes retraining, using the at least one processor, the image-query understanding model using a correlation between the target image area and the target phrase to obtain a retrained image-query understanding model.

In a second embodiment, an electronic device includes at least one memory configured to store instructions. The electronic device also includes at least one processing device configured when executing the instructions to obtain an image-query understanding model. The at least one processing device is also configured when executing the instructions to obtain an image and a user query associated with the image, where the image includes a target image area and the user query includes a target phrase. The at least one processing device is further configured when executing the instructions to retrain the image-query understanding model using a correlation between the target image area and the target phrase to obtain a retrained image-query understanding model.

In a third embodiment, a non-transitory machine-readable medium contains instructions that when executed cause at least one processor of an electronic device to obtain an image-query understanding model. The medium also contains instructions that when executed cause the at least one processor to obtain an image and a user query associated with the image, where the image includes a target image area and the user query includes a target phrase. The medium further contains instructions that when executed cause the at least one processor to retrain the image-query understanding model using a correlation between the target image area and the target phrase to obtain a retrained image-query understanding model.

In a fourth embodiment, a method includes obtaining, using at least one processor of an electronic device, a user instruction to perform an operation. The method also includes obtaining, using the at least one processor, an image showing a first area to perform the operation. The method further includes determining, using the at least one processor and an image-query understanding model, a second area that is a subset of the first area based on the user instruction. The image-query understanding model is trained based on a correlation between a target image area of a second image and a target phrase of a user query. In addition, the method includes performing, using the electronic device, the operation for the second area according to the user instruction.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another.

For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 9, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

One challenge of current robotic systems is the ability to learn new knowledge provided or taught by users and to transfer the learned knowledge when the context changes. For example, when a user asks a conventional robot cleaner to clean a carpet stain, the robot may not understand how to clean an area that the robot has never seen before or that is not matched with its predefined patterns. The process of having the robot learn a new cleaning operation based on captured images and user instructions is very challenging. It is even more challenging when the robot tries to transfer learned knowledge when the environment context changes (such as from carpet to other flooring) or the user's query changes.

Some robot systems can be pre-trained to understand a given image and determine a correlated region based on a given utterance. However, these systems do not have the capability to transfer knowledge using a new image with a different user query when both the new image and the different user query are not in the robot's corresponding training data. One reason is that existing image-query understanding systems (or "visual question answering (VQA) systems") cannot capture a change of image contexts (such as by allocating different weights to carpet or hard flooring), and a robot cannot determine a correct answer in an image when the user's query changes.

As a particular example of this, a conventional robot cleaner may learn to clean a specific color stain (such as "grey") after the user instructs the robot verbally and visually indicates the "grey" area (such as by circling the area in an image). However, when the user later asks the robot to clean an "orange" area, the robot cannot recognize the command since the robot cannot interpret what "orange" means based on what it has already learned. Thus, a robust interpretable image-query understanding system, which can learn image and query context information and transfer its learned knowledge when the context changes, would be useful here.

This disclosure provides systems and methods for robust image-query understanding based on weighted contextual features. The disclosed systems and methods can be used to resolve interpretability issues when an electronic device (such as a robot) needs to make a decision based on its own captured image(s) and one or more instructions from a user. Note that while some of the embodiments discussed below are described in the context of a cleaning robot performing cleaning operations, this is merely one example, and it will be understood that the principles of this disclosure may be implemented in any number of other suitable contexts.

Figure 1:
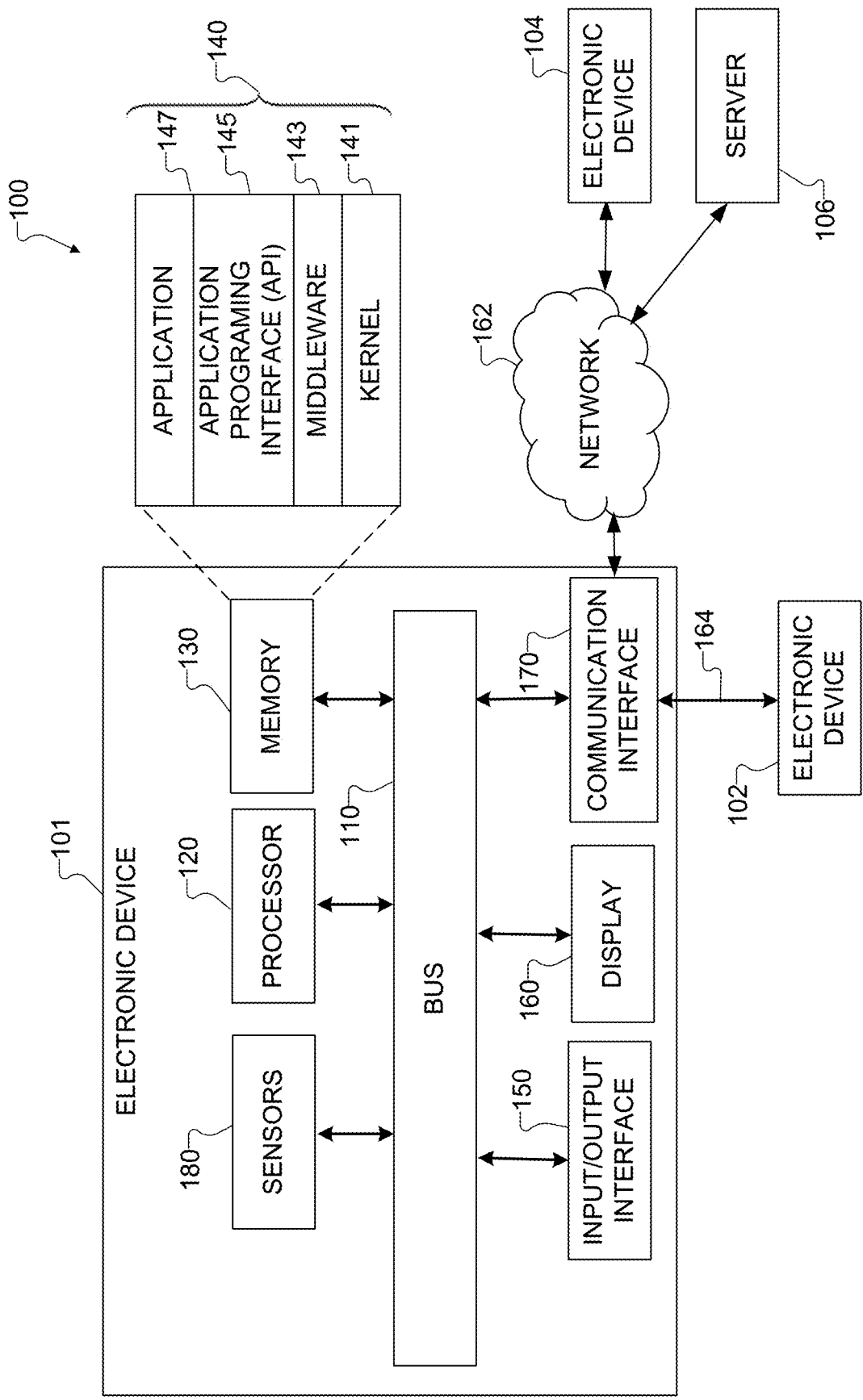
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations to support robust image-query understanding based on weighted contextual features.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for retraining or using an image-query understanding model as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support robust image-query understanding based on weighted contextual features.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
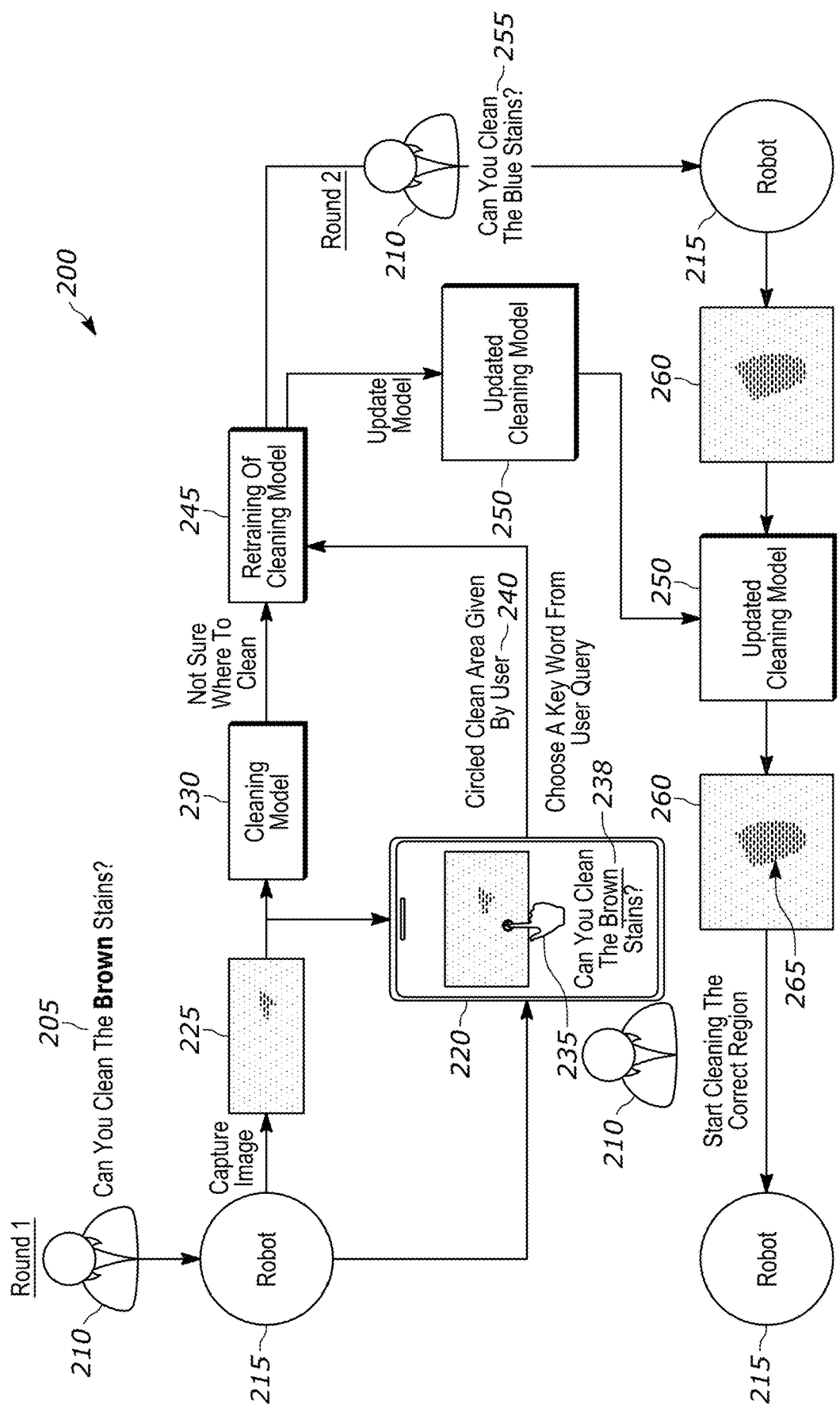
FIG. 2 illustrates an example process that uses a retraining technique for robust image-query understanding according to this disclosure.

FIG. 2 illustrates an example process 200 that uses a retraining technique for robust image-query understanding according to this disclosure. The process 200 is described in the context of a user interacting with a cleaning robot, which may include the components of the electronic device 101 described above. However, this is merely one example, and the process 200 could include any suitable context(s) or device(s).

As shown in FIG. 2, the process 200 includes two rounds, namely "Round 1" and "Round 2." Round 1 incorporates a training mode that involves a retraining technique, and Round 2 is an inference mode that does not include the retraining technique. Here, the process 200 starts with a user 210 posing a query 205 to a cleaning robot 215 to clean brown stains that are on a carpet. The query 205 can be a spoken request or a written request that is input by text, such as into a robot control application (or "app") executing on a mobile device 220 of the user 210. One or more images 225 of the carpet, including the stained area(s), are captured using one or more cameras. In some embodiments, the camera(s) can include one or more sensors 180 mounted on or otherwise associated with the robot 215. In some embodiments, the camera(s) can include one or more cameras that are part of the mobile device 220.

The robot 215 processes the image(s) 225 using a cleaning model 230 stored in a memory (such as the memory 130) of the robot 215. The cleaning model 230 is an image-query understanding model, which is a machine learning model trained to process images and/or user queries to generate actions to be performed by the robot 215. The robot 215 also transmits the image(s) 225 to the mobile device 220 of the user 210. In this example, it is assumed that the robot 215 has not yet been suitably trained to understand the query "Can you clean the brown stains?" In particular, it is assumed that the robot 215 does not understand the term "brown" in the context of an image of a carpet stain. Thus, the robot 215 does not fully understand where to clean.

Figure 3:
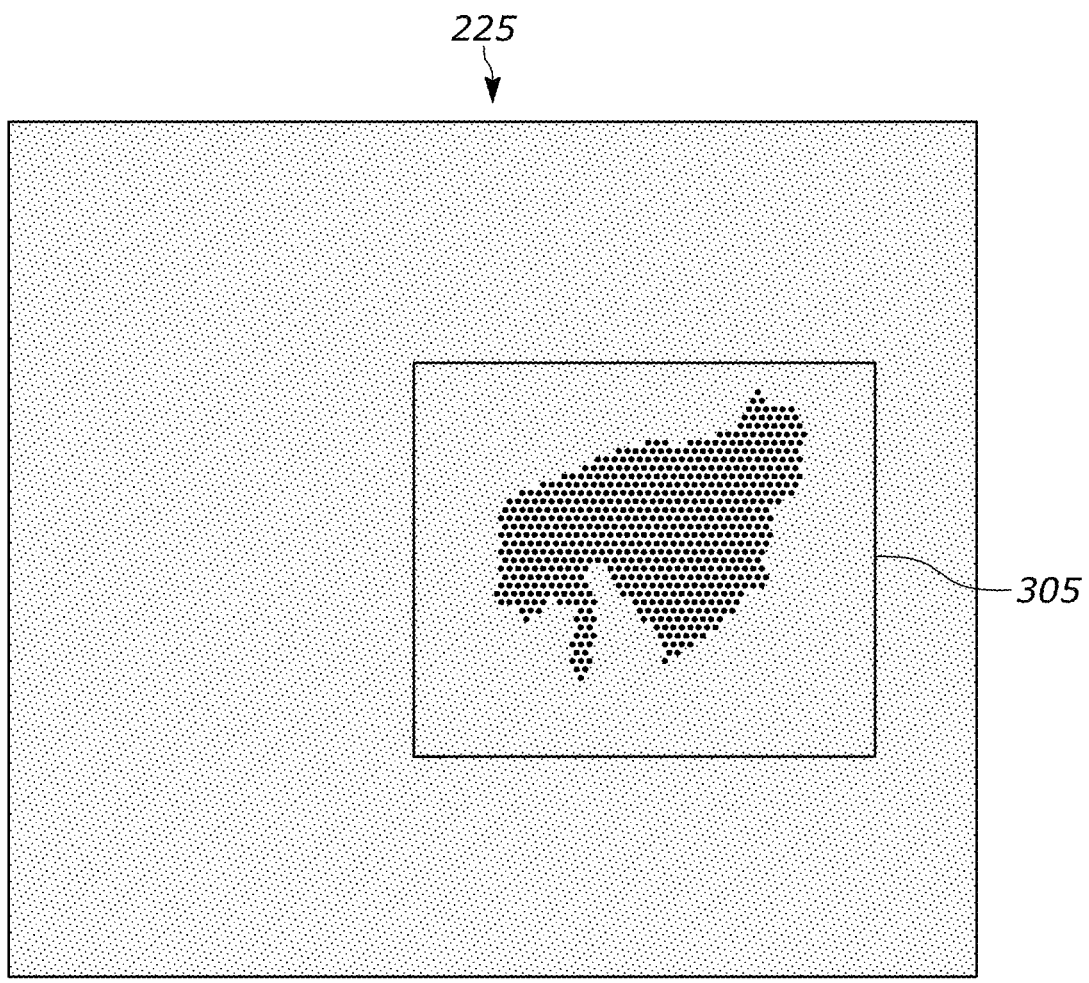
FIG. 3 illustrates an example enlarged view of an image with a target image area marked by a user according to this disclosure.

If the user 210 determines that the robot 215 does not clean the correct area, or if the robot notifies the user 210 that it has difficulty processing the query, the user 210 can cause the robot 215 to be retrained. To trigger retraining, the user 210 can view the image(s) 225 via the app on the mobile device 220. At step 235, the user 210 identifies a target image area (the area with brown stains to be cleaned) in the image(s) 225, such as by drawing or "dragging" a circle or rectangular box around the target image area. As used here, the target image area represents an area of an image 225 that is to be the focus of the robot's attention to respond to the query (the area to be cleaned). FIG. 3 illustrates an example enlarged view of the image 225 with the target image area 305 marked by the user 210 with a rectangular box. The portion of the image 225 outside of the target image area 305 can be referred to as the image level context.

The user 210 also identifies a target phrase 238 ("brown") in the query 205, such as by highlighting, underlining, or otherwise selecting the target phrase 238 in the app. As used here, the target phrase 238 is a word or phrase in a user query that can be used to distinguish the target image area 305 from the rest of the image 225. The portion of the query 205 other than the target phrase 238 can be referred to as the query level context.

Once the user 210 identifies the target image area 305 and the target phrase 238, the app records the coordinates of the target image area 305, such as by recording the positions of the bottom-left and top-right corners of the target image area 305, according to some embodiments. At step 240, the image 225, the query 205, the target phrase 238, and the target image area 305 are provided as inputs to a retraining operation 245 for retraining the cleaning model 230, according to some embodiments. In some embodiments, the retraining operation 245 is performed using one or more cloud-based servers, since cloud environments typically have high computational capabilities suitable for machine learning. In other embodiments, the robot 215 or the mobile device 220 may have adequate processing capabilities to perform the retraining operation 245. In still other embodiments, another local or remote device may be used to perform the retraining operation 245. As described in greater detail below, the retraining operation 245 can leverage contextual information in the query 205 and the image 225 by allocating higher attention weights to the target image area 305 and the target phrase 238 for re-training the cleaning model 230. Once the retraining operation 245 is completed, the cleaning model 230 is updated to become an updated cleaning model 250, which can be stored in the memory of the robot 215. The robot 215 then is able to clean the brown stains on the carpet as indicated by the query 205.

Later, in Round 2, the user 210 poses another query 255 to the robot 215. In this example, the query 255 is similar to the query 205, except the query 255 here is now to clean blue stains. The robot 215 captures an image 260 of an area and leverages the updated cleaning model 250 to understand the query 255. The robot 215 is therefore able to identify a region 265 in the image 260 that includes one or more blue stains and then proceed to clean the region 265.

Although FIG. 2 illustrates one example of a process 200 that uses a retraining technique for robust image-query understanding and FIG. 3 illustrates one example of an enlarged view of an image with a target image area marked by a user, various changes may be made to FIGS. 2 through 3. For example, while shown as a specific sequence of operations, various operations shown in FIG. 2 could overlap, occur in parallel, occur in a different order, or occur any number of times (including zero times). Also, the specific operations shown in FIG. 2 are examples only, and other techniques could be used to perform each of the operations shown in FIG. 2. In addition, the image contents and the target image area marked by the user in FIG. 3 can vary widely based on the circumstances.

FIGS. 4 through 7 illustrate an example process 400 for retraining an image-query understanding model according to this disclosure. For ease of explanation, the process 400 is described as including the retraining operation 245 of the cleaning model 230 shown in FIG. 2, which may include the components of the electronic device 101 described above. However, the process 400 could be implemented by any other suitable module in any other suitable electronic device and in any suitable system, such as when implemented using the server 106. It is noted that a similar process can be performed when executing the cleaning model 230 in an inference mode. Differences between the retraining mode and the inference mode will be described below.

Figure 4:
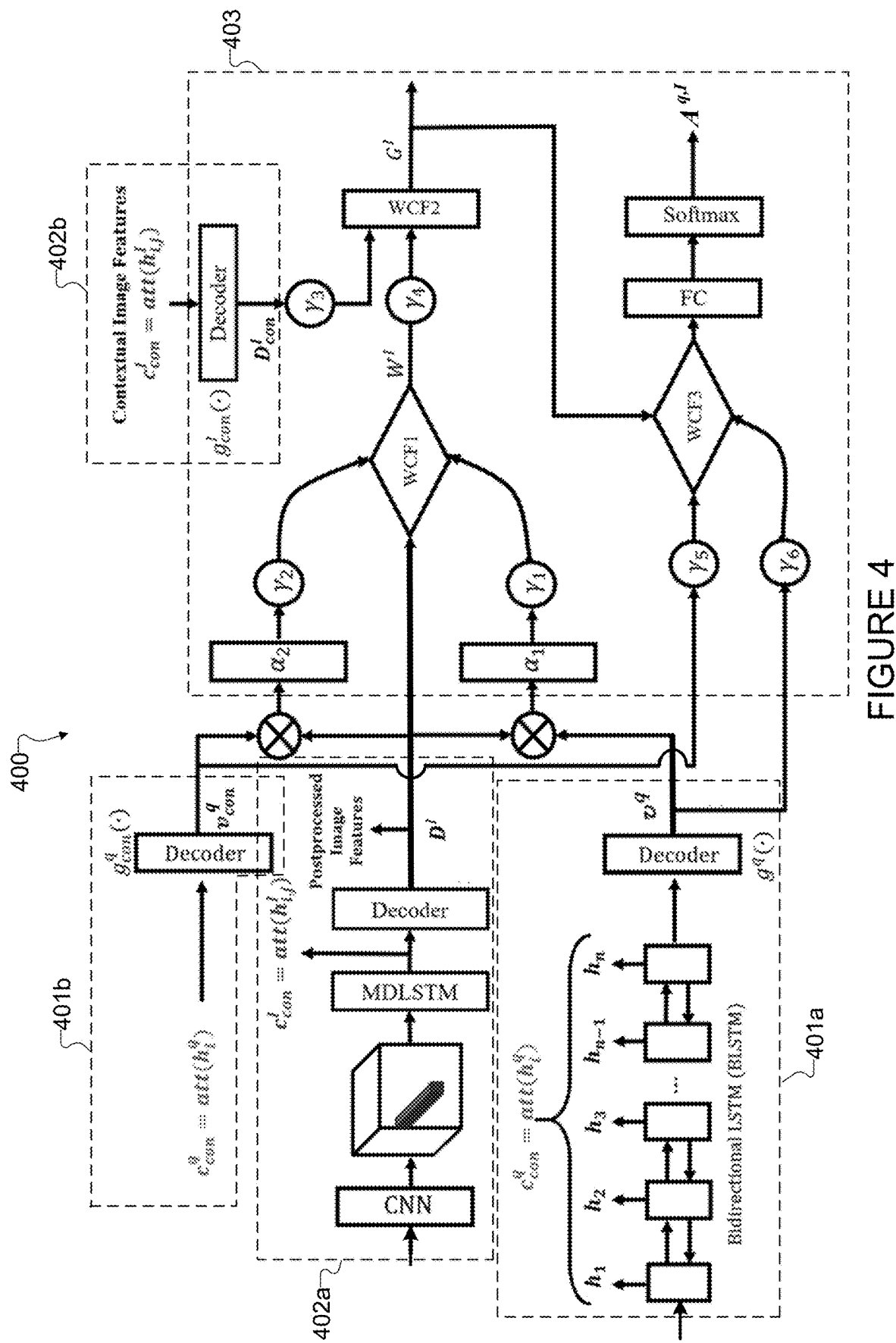
FIGS. 4 through 7 illustrate an example process for retraining an image-query understanding model according to this disclosure.
Figure 5:
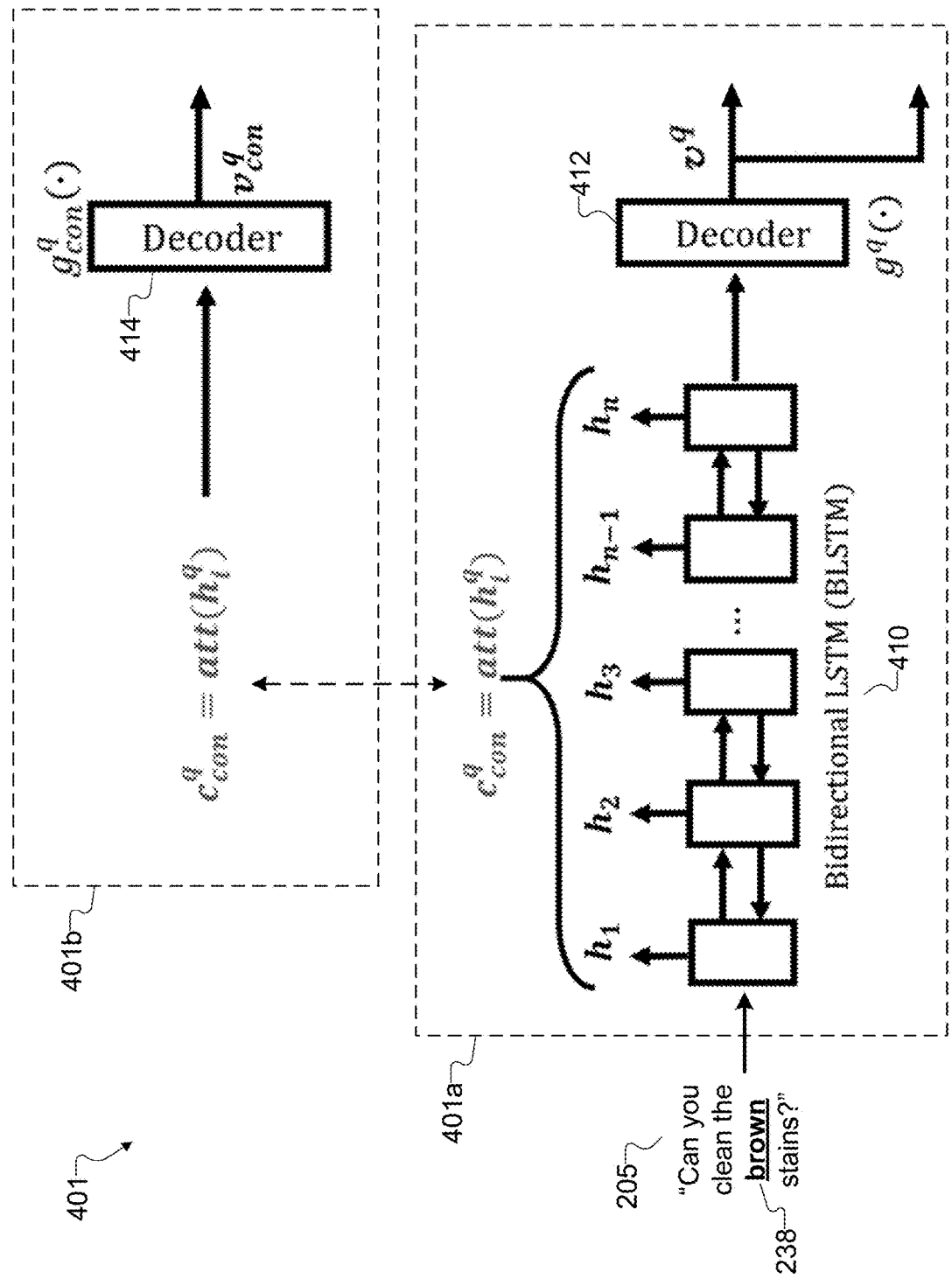
Figure 6:
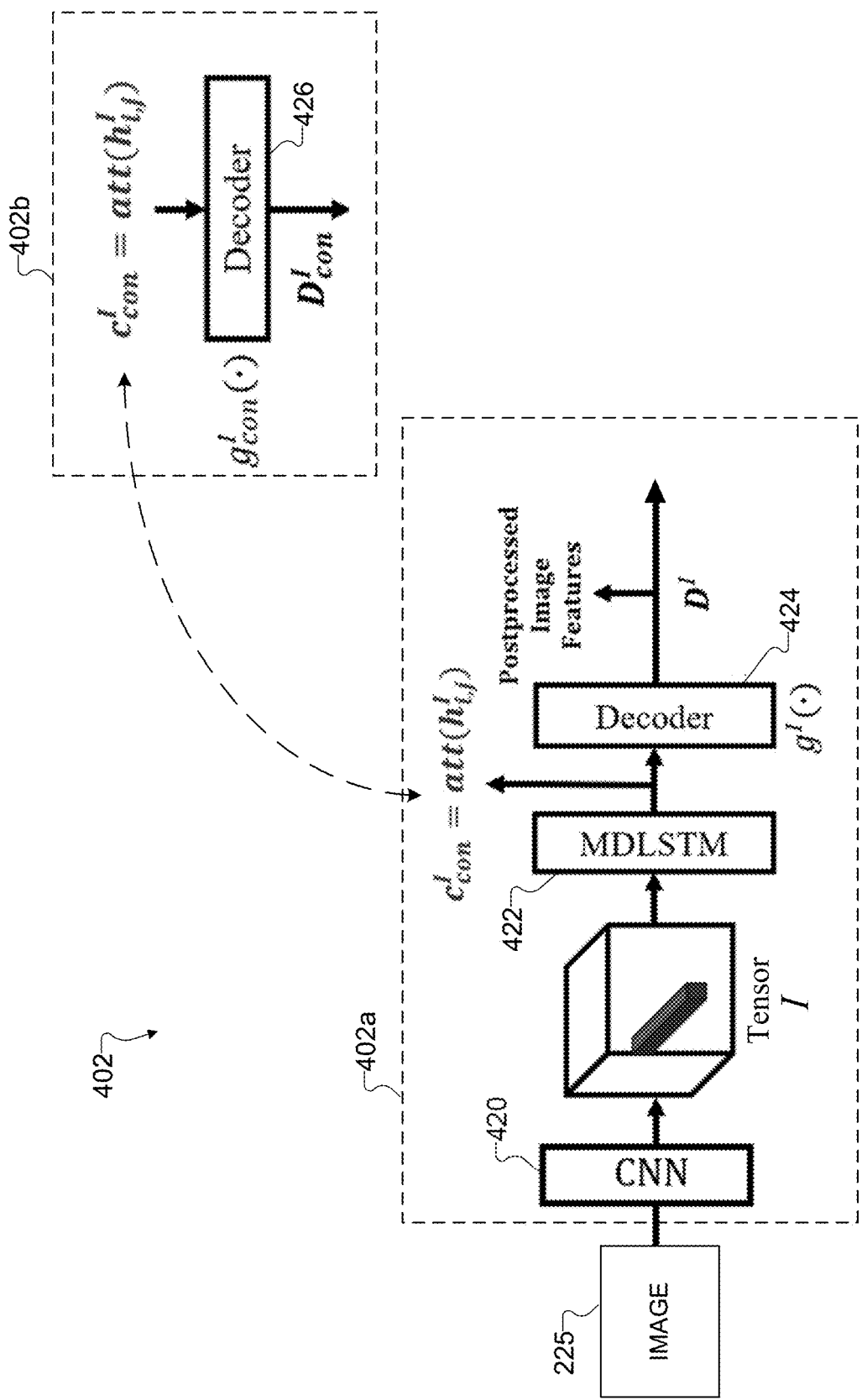
Figure 7:
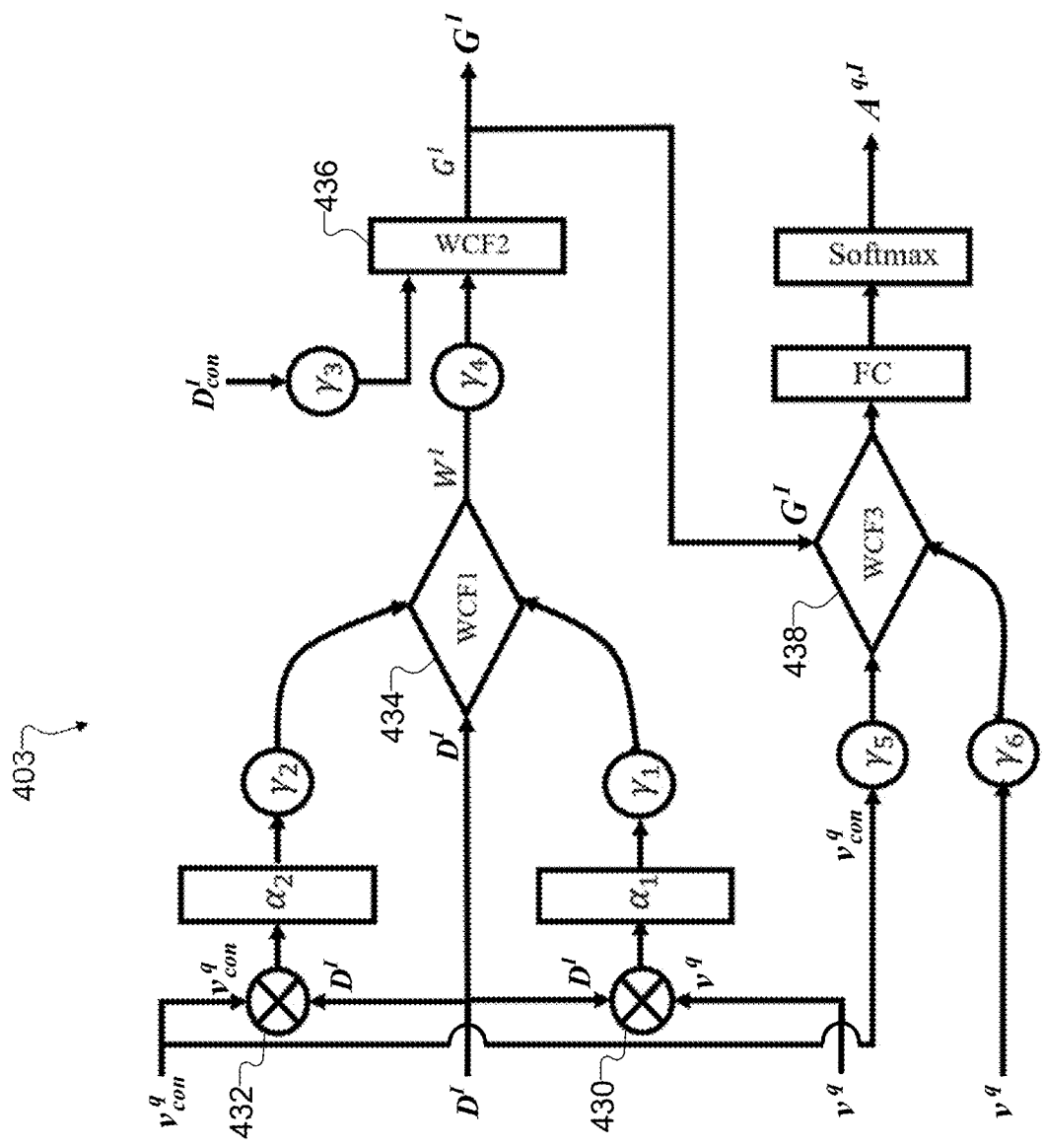

As shown in FIG. 4, the process 400 involves the use of a Question Contextual Feature Extraction (Q-CFE) module 401 (which includes portions 401a and 401b), an Image Contextual Feature Extraction (I-CFE) module 402 (which includes portions 402a and 402b), and a Weighted Contextual Feature (WCF)-based Question-Image Understanding (QIU) module 403. FIGS. 5 through 7 show enlarged views of each of these modules 401-403 for clarity and ease of understanding.

As shown in FIG. 5, the Q-CFE module 401 receives user queries, such as the query 205 ("Can you clean the brown stains?"), posed to the robot 215 by the user 210. The Q-CFE module 401 operates to extract semantic contextual features $c_{con}^q$ and question features $v^q$ from the query 205. The features $c_{con}^q$ and $v^q$ are vectors that represent different portions of the query 205 as described in greater detail below. The question features $v^q$ contain information regarding the full query 205 including the target phrase 238. The Q-CFE module 401 inputs the query 205 to a bidirectional long short term memory (BLSTM) network 410, according to some embodiments. The BLSTM network 410 is a type of recurrent neural network (RNN) that can learn order dependence in sequence prediction problems. One advantage of the BLSTM network 410 is that it can capture sentence-level information in the query 205 in both forward and backward directions, so reasonably well-balanced encoded information can be obtained by the BLSTM network 410.

The BLSTM network 410 operates using a series of timestamps one to n, where timestamp one is the first timestamp and timestamp n is the last timestamp. Each timestamp corresponds to one of the words $(x_1, \ldots, x_n)$ in the query 205. During training, the words of the query 205 (the question inputs) are read into the BLSTM network 410 in the forward and backward directions, and the BLSTM network 410 generates two hidden state sequences ($hf_t$ and $hb_t$) for the forward and backward directions, respectively. A hidden state $h_t$ in timestamp t is obtained as a concatenation of $hf_t$ and $hb_t$, where $h_t = [hf_t, hb_t]$. The hidden state $h_t$, which is the last output of the BLSTM network 410, is provided as an input to a decoder 412 in order to determine the extracted question features $v^q$. The decoder 412 is an RNN-based decoder for generating question sequence embeddings.

The BLSTM network 410 also generates the question-level semantic contextual features $c_{con}^q$ using an attention function att(•). In some embodiments, the attention function for generating the question-level semantic contextual features $c_{con}^q$ during retraining can be mathematically represented as follows:

$$c_{con}^q = \Sigma_{j, j \neq k}^n \alpha_{i,j} h_j^q + 1 \cdot h_k^q \quad (1)$$

Here, k represents the position of the target phrase 238 (such as "brown") in the query 205, i represents an index of all words from 1 to n, j represents an index of all hidden states from 1 to n except k, and $\alpha_{i,j}$ represents the attention weight (which may represent a value between 0 and 1, inclusive). Larger values of $\alpha_{i,j}$ may indicate a greater importance of the corresponding term, and smaller values of $\alpha_{i,j}$ may indicate a lesser importance of the term. The contextual query level features represent the contextual query level information for the query level context, which is outside the target phrase 238. For example, in the query "Can you clean the brown stains?", the word "brown" is the target phrase 238, and the words "Can you clean the _____ stains" are the query level context. The contextual query level features are the features representing the query level context.

During retraining, the question-level semantic contextual features $c_{con}^q$ can be generated by weighted attention of tokens (where each token can be one word in a query) not including the target phrase 238 ($\Sigma_{j, j \neq k}^n \alpha_{i,j} h_j^q$), plus an adjusted full weight (equal to 1) of the hidden state $h_k^q$ of the target phrase 238. Thus, the retraining can capture both the weighted context and the target phrase 238. During inference, a conventional or other attention mechanism can be used (as described in greater detail below) since $\alpha_{i,j}$ is trained and their values are fixed. The use of the full weighted hidden state $(1 \cdot h_k^q)$ of the target phrase 238 in training enables separation of the contextual information $\Sigma_{j, j \neq k}^n \alpha_{i,j} h_j^q$ from the target information $1 \cdot h_k^q$. Conventional approaches cannot separate the contextual information from the target information because such approaches put every part of the query in the attention (including the target phrase 238). Furthermore, it allows effective retraining of the cleaning model 230 using only one sample. Other approaches need many data samples to learn a correct value of $\alpha_{i,k}$ for the target phrase feature $h_k^q$ such that $\alpha_{i,k} \to 1$ after being trained using the data samples. In contrast, the process 400 only requires one sample since the target phrase 238 is identified (such as in step 235), which forcefully sets $\alpha_{i,k} = 1$.

Once the question-level semantic contextual features $c_{con}^q$ are determined, these features can be provided as an input to a decoder 414 in order to determine the extracted question-level contextual features $v_{con}^q$. The vector $v_{con}^q$ represents the decoded question-level contextual features of the query 205. In some embodiments, the determination of the extracted question features $v^q$ and the extracted question-level contextual features $v_{con}^q$ can be mathematically represented as follows:

$$s_n^1 = g^q(s_{n-1}^1, h_n^q) \quad (2)$$

$$v^q = g^q(s_{n-1}^1, h_n^q) \quad (3)$$

$$s_n^2 = g_{con}^q(s_{n-1}^2, c_{con}^q) \quad (4)$$

$$v_{con}^q = g_{con}^q(s_{n-1}^2, c_{con}^q) \quad (5)$$

Here, $g^q(\bullet)$ represents operations performed by the decoder 412, $g_{con}^q(\bullet)$ represents operations performed by the decoder 414, $c_{con}^q$ represents the question-level semantic contextual features, $s_t^1$ represents the hidden state generated by $g^q(\bullet)$, and $s_t^2$ represents the hidden state generated a $g_{con}^q(\bullet)$.

Turning to FIG. 6, the I-CFE module 402 is shown in greater detail. As shown in FIG. 6, the I-CFE module 402 receives images, such as the image 225, captured by the robot 215, the user's mobile device 220, or other source. The I-CFE module 402 generally operates to extract image contextual features from the image 225 using a multi-dimensional LSTM (MDLSTM) network 422. Here, the I-CFE module 402 provides raw image data of the image 225 to a convolutional neural network (CNN) 420, which generates an image feature tensor I (a multi-dimensional vector). The CNN 420 can generate the tensor I by extracting embedding features of the raw image data before a final softmax layer. In some embodiments, the tensor I has three dimensions and a size of 2048×14×14. Of course, other tensors I have other sizes and more or fewer dimensions may be used.

The tensor I is provided to the MDLSTM network 422, which reads in each image feature $I_{i,j} \in I$ together with the hidden state vectors $h_{i,j-1}$ and $h_{i-1,j}$ generated from the image features $I_{i,j-1}$ and $I_{i-1,j}$. Here, i and j are indexes representing features in horizontal and vertical directions, respectively, of the tensor I. The hidden states are provided as inputs to a subsequent MDLSTM-based decoder 424, which decodes the hidden states to generate post-processed image features $D^I$. The decoder 424 may be an RNN-based decoder similar to the decoders 412 and 414. In some embodiments, the determination of the post-processed image features $D^I$ can be mathematically represented as follows:

$$D_{i,j}^I = g^I(s_{i-1,j}^I, s_{i,j-1}^I, h_{i,j}^I) \quad (6)$$

where $g^I(\bullet)$ represents operations performed by the decoder 424, and $s_{i-1,j}^I$ and $s_{i,j-1}^I$ are hidden states generated by the decoder 424.

The MDLSTM network 422 also generates image contextual features $c_{con}^I$ using an attention function att($\bullet$). In some embodiments, the attention function for generating the image contextual features $c_{con}^I$ during retraining can be mathematically represented as follows:

$$c_{con}^I = \Sigma_{i=1,i\neq k}^n \Sigma_{j=1,j\neq l}^n \alpha_{i,j} h_{i,j}^I + \Sigma_{i=1,i\neq k}^n 1 \cdot h_{i,l}^I + \Sigma_{j=1, j\neq l}^n 1 \cdot h_{k,j}^I, \quad (7)$$

Here, n×n represents the number of image features generated by the CNN 420 from the raw image data of the image 225. Also, $\alpha_{i,j}$ represents an attention weight that may be calculated as follows, according to some embodiments:

$$\alpha_{i,j} = \frac{\exp(\tau_{i,j})}{\sum_{i=1}^n \sum_{j=1}^n \exp(\tau_{i,j})} \quad (8)$$

$$\tau_{i,j} = \phi(s_I, h_{i,j}^I). \quad (9)$$

In Equation (7), i corresponds to the horizontal index representing the target image area 305, and j corresponds to the vertical index representing the target image area 305. The indexes k and l can be explained by an example. Suppose the length of the full image 225 is X, and the width of the full image 225 is Y. Both sides of the full image 225 are divided into n slices such that each horizontal block is X/n and each vertical block is Y/n. The $k^{th}$ horizontal block therefore starts from (k−1)×X/n and ends at k×X/n. Similarly, the $l^{th}$ vertical block starts from (l−1)×Y/n and ends at l×Y/n.

In Equation (7), the term $\Sigma_{i=1,i\neq k}^n \Sigma_{j=1,j\neq l}^n \alpha_{i,j} h_{i,j}^I$ contains image features for the image 225 excluding the target image area 305. The term $\Sigma_{i=1,i\neq k}^n 1 \cdot h_{i,l}^I$ contains horizontal image features of the target image area 305 by fixing vertical index l. The term $\Sigma_{j=1,j\neq l}^n 1 \cdot h_{k,j}^I$ contains vertical image features of the target image area 305 by fixing horizontal index k. The last two terms use a weighting coefficient equal to one to represent full weight, since the module 402 operates to highlight (put a greater emphasis on) the target image area 305.

Once the image contextual features $c_{con}^I$ are determined, these features can be provided as an input to a decoder 426 in order to determine the image contextual features $D_{con}^I$. In some embodiments, the determination of the image contextual features $D_{con}^I$ can be mathematically represented as follows:

$$D_{con}^I = g_{con}^I(s_{n-1,n}^I, s_{n,n-1}^I, c_{con}^I) \quad (10)$$

where $s_{n-1,n}^I$ and $s_{n,n-1}^I$ are hidden states generated by the decoder 426. As a point of comparison, $D_{con}^I$ may contain only the contextual image information of the image 225 outside of the target image area 305, while $D^I$ may contain the image information of the full image 225.

During retraining, the image level contextual features $c_{con}^I$ are generated by weighted attention of features not including the target image area 305 ($\Sigma_{i=1,i\neq k}^n \Sigma_{j=1,j\neq l}^n \alpha_{i,j} h_{i,j}^I$) plus an adjusted full weight (equal to 1) of the hidden states of image features of the target image area 305 ($\Sigma_{i=1,i\neq k}^n h_{i,l}^I + \Sigma_{j=1,j\neq l}^n h_{k,j}^I$). Thus, the retraining can capture both the weighted context and the target area. During inference, a conventional or other attention mechanism can be used (as described in greater detail below) since $\alpha_{i,j}$ is trained and their values are fixed.

Turning to FIG. 7, the WCF QIU module 403 is shown in greater detail. Once the various feature vectors ($v^q$, $v_{con}^q$, $D^I$, $D_{con}^I$) have been extracted from the query 205 and the image 225 using the Q-CFE module 401 and the I-CFE module 402, the WCF QIU module 403 uses these features based on their importance. In this example, the WCF QIU module 403 uses a WCF-based approach to take advantage of the contextual vectors generated by the modules 401 and 402. This technique can understand the query 205 about the given image 225 in order to associate the target image area 305 with the target phrase 238, which is the most closely-related image-question pair. In particular, the WCF QIU module 403 establishes multiple weights that indicate the importance of projections of the different vectors to each other. As used here, projection refers to the relationship between two vectors, such as vector A and vector B. That is, projection explains how close the two vectors are to one another. In some embodiments, projection can be represented by an inner product. For example, the inner product of vector A and vector B refers to the projection of vector B to vector A. Of course, in other embodiments, projection can be represented using other suitable techniques. In the process 400, it is desired to determine how close the meaning of each query vector is to the meaning of the associated image vector.

As shown in FIG. 7, the WCF QIU module 403 uses two projection functions 430 and 432 to determine attention weight vectors $\alpha_1$ and $\alpha_2$. The vector $\alpha_1$ represents attention weights of the image features from the perspective of the question embedding (the projection of the query to the image). Similarly, the vector $\alpha_2$ represents attention weights of the image features from the perspective of the question context embeddings (the projection of the query context to the image).

In some embodiments, the projection function 430 is performed to generate the attention weight vector $\alpha_1$ as follows:

$$\alpha_1 = \sigma((D^I)^T v_q) \quad (11)$$

$$\sigma(z,j) = \frac{e^{z_j}}{\sum_{k=1}^n e^{z_k}} \text{ for } j = \{1, \ldots, n\} \quad (12)$$

Here, $\alpha_1$ represents a normalized softmax weighting ($\sigma(\bullet)$) of an inner product of the post-processed image feature vector $D^I$ and the decoded question feature vector $v^q$. The inner product between $D^I$ and $v^q$ represents the projection of the decoded question feature vector $v^q$ onto the post-processed image feature vector $D^I$, which indicates the impact of query information on image information. In this case, the inner product output is a vector containing this impact information. Similarly, in some embodiments, the projection function 432 is performed to generate the attention weight vector $\alpha_2$ as follows:

$$\alpha_2 = \sigma((D^I)^T v_{con}). \quad (13)$$

Here, the projection of the question contextual features $v_{con}^q$ onto the post-processed image feature vector $D^I$ highlights the image features that are most useful.

Once the attention weight vectors $\alpha_1$ and $\alpha_2$ are determined, the WCF QIU module 403 can assign additional weight parameters $\gamma_1$, $\gamma_2$ to the attention weight vectors $\alpha_1$, $\alpha_2$ in order to enable further learning of the relative importance of the attention weights from different sources. The WCF QIU module 403 also performs a WCF function 434 to generate a new image feature $W^I$ using the additional weight parameters. In some embodiments, this may be represented as follows:

$$\alpha_{1,2}=\gamma_1\alpha_1+\gamma_2\alpha_2 \quad (14)$$

$$W^I=\alpha_{1,2}{}^T D^I. \quad (15)$$

The weight parameters $\gamma_1$, $\gamma_2$ represent different weights of query or query context to the image 225. If the query context is more important to an image, the value of $\gamma_2$ is higher. Otherwise, the value of $\gamma_1$ is higher. As an example of this, consider the two following queries related to the image 225. Query 1 asks "Can you clean the BROWN stain?" Query 2 asks "CAN YOU CLEAN the area?" (Note that different words here are capitalized for emphasis). The value of $\gamma_2$ in Query 1 is smaller than the value of $\gamma_2$ in Query 2, as the contextual information ("CAN YOU CLEAN") is more important in Query 2 but the target phrase 238 ("BROWN") is more important in Query 1 comparatively. The weight parameters $\gamma_1$, $\gamma_2$ are introduced in the cleaning model 230 to learn the importance of contextual information so that the cleaning model 230 can handle any new queries when the context changes.

The image feature $W^I$ is the projection of the query 205 (including query context) to the image 225. The image feature $W^I$ contains the impacts of query and query context to the image 225. The information from the target image area 305 is included in the image contextual information $D_{con}{}^I$. To incorporate the image contextual information $D_{con}{}^I$, the WCF QIU module 403 can assign additional weight parameters $\gamma_3$, $\gamma_4$ to the vectors $D_{con}{}^I$ and $W^I$ and performs a WCF function 436 to generate a projected image vector $G^I$. In some embodiments, this may be represented as follows:

$$G^I=\gamma_3 D_{con}{}^I+\gamma_4 W^I. \quad (16)$$

The projected image vector $G^I$ represents the target image area 305 based on the given question and robot-captured raw image. The weight parameters $\gamma_3$, $\gamma_4$ are introduced to weight the capability of the cleaning model 230 to understand the image 225 (this capability is represented in $W^I$) with the image context ($D_{con}{}^I$) other than the target image area 305 based on the query 205. If the cleaning model 230 already understands where to clean by examining the image 225, the value of $\gamma_4$ is set to a higher value. Otherwise, the WCF QIU module 403 assigns more weight on the query 205 by setting the value of $\gamma_3$ to a higher value.

For better understanding, consider the process 200 of FIG. 2. In Round 1, before the cleaning model 230 is retrained, $G^I$ contains little or no meaningful information indicating the location of the region that needs to be cleaned. In step 235, the user 210 indicates the target image area 305. During the retraining operation 245, the WCF QIU module 403 trains the cleaning model 230 to learn the relationships between four different groups of features ([image target, query target], [image context, query context], [image context, query target], and [image target, query context]), which results in an updated $G^I$ containing the target image area information. This can be used in Round 2 of the process 200.

In addition to generating the projected image vector $G^I$, the WCF QIU module 403 generates a logical decision (or answer) $A^{q,I}$. The logical decision $A^{q,I}$ (such as 0 or 1 for yes or no) indicates an answer to a user query, such as whether or not the robot 215 can clean the area indicated in the query 205. The logical decision $A^{q,I}$ may be generated based on the convolution of the query 205 and its query-level information $v_{con}{}^q$ to the prior information $G^I$. Before determining $A^{q,I}$, the WCF QIU module 403 can assign weight parameters $\gamma_5$ and $\gamma_6$, which represent the importance of the query context versus that of the query 205. The WCF QIU module 403 performs a WCF function 438 to generate the logical decision $A^{q,I}$ using the weight parameters $\gamma_5$ and $\gamma_6$. In some embodiments, this may be represented as follows:

$$v_{q,con}=\gamma_5 v_{con}{}^q + \gamma_6 v^q \quad (17)$$

$$A^{q,I}=G^I * v_{q,con}. \quad (18)$$

The explanation of the process 400 above describes a retraining mode for the cleaning model 230. In addition, many of the operations of the process 400 can be performed in an inference mode, where the cleaning model 230 is already retrained into the updated cleaning model 250. Operations performed in the inference mode generally correspond to Round 2 in the process 200 of FIG. 2. In the inference mode, the user 210 does not provide an indication of a target phrase or a target image area. Thus, the updated cleaning model 250 only receives a query (such as the query 255) and an image (such as the image 260). Without a target phrase 238 or a target image area 305, the determination of $c_{con}{}^q$ and $c_{con}{}^I$ in the Q-CFE module 401 and the I-CFE module 402, respectively, are different in the inference mode. For example, in contrast to Equation (1) above, the determination of $c_{con}{}^q$ by the Q-CFE module 401 in the inference mode can be mathematically represented as follows:

$$c_{con}{}^q=\Sigma_j{}^n \alpha_{i,j} h_j{}^q. \quad (19)$$

Equation (19) does not include the $1 \cdot h_k{}^q$ term of Equation (1) because there is no target phrase 238 in the inference mode for which to determine a hidden state. Similarly, in contrast to Equation (7) above, the determination of $c_{con}{}^I$ by the I-CFE module 402 in the inference mode can be mathematically represented as follows:

$$c_{con}{}^I=\Sigma_{i=1}{}^n \Sigma_{j=1}{}^n \alpha_{i,j} h_{i,j}{}^I. \quad (20)$$

Equation (20) does not include the terms $\Sigma_{i=1,i\neq k}{}^n 1 \cdot h_{i,l}{}^I$ and $\Sigma_{j=1,i\neq l}{}^n 1 \cdot h_{k,j}{}^I$ of Equation (7) because there is no target image area 305 in the inference mode.

In some embodiments, rather than indicate an area to clean, the user 210 can constrain the path of the robot 215 by indicating an area that the user 210 does not want the robot 215 to clean. This can be useful, for example, to avoid cables running along the floor or other obstacles. As a particular example, the user 210 can activate an "area to avoid" mode on the app on the mobile device 220 and indicate an area not to be cleaned by marking an image (similar to marking the target image area 305). In this example, the robot 215 would not receive any user queries but would receive a user-highlighted image area to be avoided. Since there is no query or target phrase, only a portion of the retraining process 400 is triggered. For instance, without a particular query, the Q-CFE module 401 would not need to be performed. Once retrained, the robot 215 using the updated cleaning model 250 would understand how to clean around the region to be avoided.

Also, in some embodiments, the robot 215 can not only learn context information (such as a floor stain color) from a query but also context information from an image. Later, when the image context is changed (such as when the robot 215 moves from a carpeted region to a wood floor region), the robot 215 can still recognize the context based on the user query and perform an action accordingly (such as cleaning a stain on the wood floor instead of carpet).

As described here, the process 400 provides a number of advantages over other VQA training techniques. For example, the process 400 enables the robot 215 to capture both query-level contextual information and image contextual information. The contextual information can be leveraged in a weighted manner from both the image and the query. This enables the robot 215 to give correct answers or perform correct operations even when the image context or query context changes. Experiments indicate that the process 400 can give significantly improved performance to determine whether or not to perform an action, and accuracy is improved over conventional VQA techniques.

The operations and functions shown in FIGS. 4 through 7 can be implemented in an electronic device 101 in any suitable manner. For example, in some embodiments, the operations shown in FIGS. 4 through 7 can be implemented or supported using one or more software applications or other software instructions that are executed by the processor 120 of the electronic device 101. In other embodiments, at least some of the operations shown in FIGS. 4 through 7 can be implemented or supported using dedicated hardware components. In general, the operations shown in FIGS. 4 through 7 can be performed using any suitable hardware or any suitable combination of hardware and software/firmware instructions.

Although FIGS. 4 through 7 illustrate one example of a process 400 for retraining an image-query understanding model and related details, various changes may be made to FIGS. 4 through 7. For example, while shown as a specific sequence of operations, various operations shown in FIGS. 4 through 7 could overlap, occur in parallel, occur in a different order, or occur any number of times (including zero times). Also, the specific operations shown in FIGS. 4 through 7 are examples only, and other techniques could be used to perform each of the operations shown in FIGS. 4 through 7.

Figure 8:
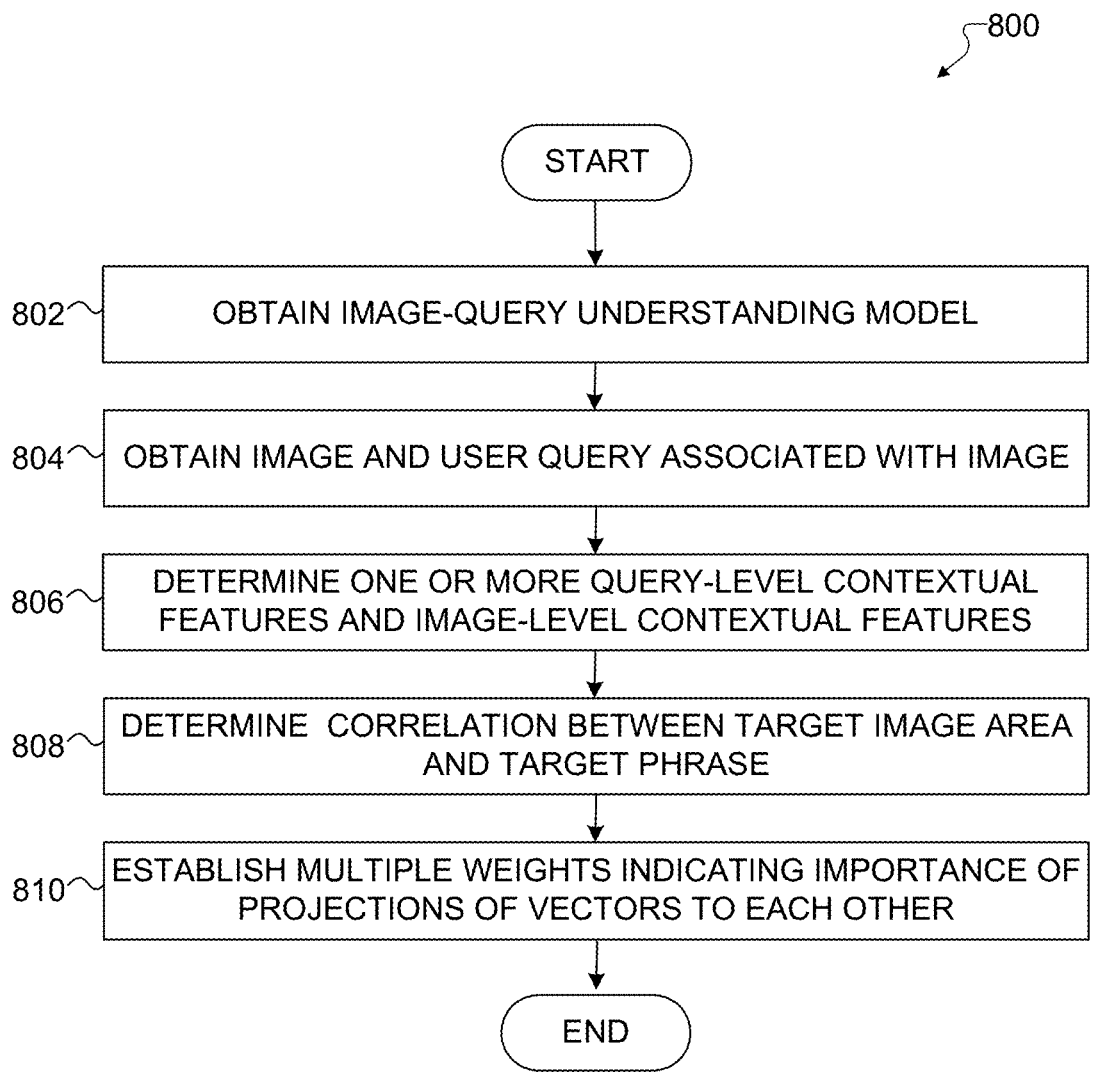
FIG. 8 illustrates an example method for retraining an image-query understanding model according to this disclosure.

FIG. 8 illustrates an example method 800 for retraining an image-query understanding model according to this disclosure. For ease of explanation, the method 800 shown in FIG. 8 is described as involving the use of the process 400 shown in FIGS. 4 through 7 and the electronic device 101 shown in FIG. 1. However, the method 800 shown in FIG. 8 could be used with any other suitable electronic device and in any suitable system.

As shown in FIG. 8, an image-query understanding model is obtained at an electronic device at step 802. This could include, for example, the electronic device 101 obtaining the cleaning model 230. In some embodiments, the image-query understanding model 250 corresponds to operations of a cleaning robot 215. An image and a user query associated with the image are obtained, where the image includes a target image area and the user query includes a target phrase, at step 804. This could include, for example, the electronic device 101 obtaining the image 225 (which includes the target area 305) and the query 205 (which includes the target phrase 238).

One or more query-level contextual features and one or more image-level contextual features are determined based on at least one weighted attention function at step 806. This could include, for example, the electronic device 101 determining $v_{con}^q$ and $D_{con}^I$ using the Q-CFE module 401 and the I-CFE module 402. A correlation between the target image area and the target phrase is determined by obtaining an inner product between a first vector representing the target image area and a second vector representing the target phrase at step 808. This could include, for example, the electronic device 101 performing the projection functions 430 and 432 to generate attention weight vectors. Multiple weights indicating an importance of projections of multiple vectors to each other are established, where the multiple vectors include the first vector and the second vector, at step 810. This could include, for example, the electronic device 101 establishing the weight parameters $\gamma_1$ through $\gamma_6$.

Although FIG. 8 illustrates one example of a method 800 for retraining an image-query understanding model, various changes may be made to FIG. 8. For example, while shown as a series of steps, various steps in FIG. 8 could overlap, occur in parallel, occur in a different order, or occur any number of times.

Figure 9:
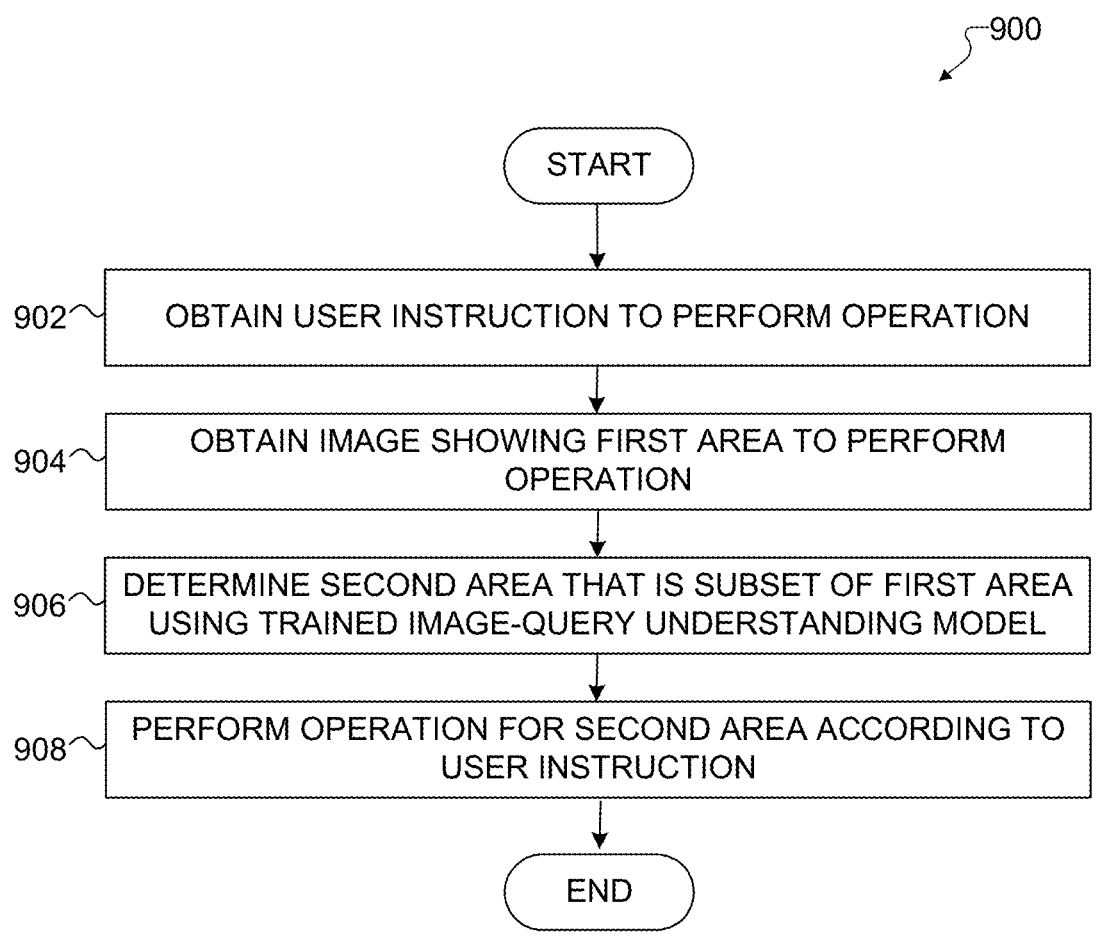
FIG. 9 illustrates an example method for using a retrained image-query understanding model according to this disclosure.

FIG. 9 illustrates an example method 900 for using a retrained image-query understanding model according to this disclosure. For ease of explanation, the method 900 shown in FIG. 9 is described as involving the use of the process 200 shown in FIG. 2, the process 400 shown in FIGS. 4 through 7, and the electronic device 101 shown in FIG. 1. However, the method 900 shown in FIG. 9 could be used with any other suitable electronic device and in any suitable system.

As shown in FIG. 9, a user instruction to perform an operation is obtained at an electronic device at step 902. This could include, for example, the electronic device 101 (which may be included in the robot 215) obtaining a query 255 to clean a surface in Round 2 of the process 200. An image showing a first area to perform the operation is obtained at step 904. This could include, for example, the electronic device 101 obtaining the image 260 showing an area of a carpet to clean.

A second area that is a subset of the first area is determined based on the user instruction using an image-query understanding model at step 906. This could include, for example, the electronic device 101 determining the region 265 in the area shown in the image 260 based on the updated cleaning model 250. The image-query understanding model 250 used here has been trained based on a correlation between a target image area of a second image and a target phrase of a user query. The operation is performed for the second area using the electronic device according to the user instruction at step 908. This could include, for example, the electronic device 101 causing the robot 215 to clean the region 265.

Although FIG. 9 illustrates one example of a method 900 for using a retrained image-query understanding model, various changes may be made to FIG. 9. For example, while shown as a series of steps, various steps in FIG. 9 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining, using at least one processor of a robot, an image-query understanding model;
   obtaining, using the at least one processor, an image and a user query associated with the image, wherein the image comprises a target image area and the user query comprises a target phrase, and wherein the target image area is marked on the image by a user and the target phrase is identified within the user query by the user during operation of the robot; and
   retraining, using the at least one processor, the image-query understanding model using a correlation between the target image area and the target phrase to obtain a retrained image-query understanding model;
wherein retraining the image-query understanding model comprises determining (i) one or more query-level contextual features, (ii) one or more question features, (iii) one or more image-level contextual features, and (iv) one or more post-processed image features based on at least one weighted attention function.

2. The method of claim 1, wherein the image-query understanding model comprises:
a question contextual feature extraction (Q-CFE) module configured to determine the one or more query-level contextual features and the one or more question features; and
an image contextual feature extraction (I-CFE) module configured to determine the one or more image-level contextual features and the one or more post-processed image features.

3. The method of claim 2, wherein the image-query understanding model further comprises a weighted contextual feature question-image understanding (WCUQIU) module configured to process (i) the one or more query-level contextual features and the one or more question features from the Q-CFE module and (ii) the one or more image-level contextual features and the one or more post-processed image features from the I-CFE module.

4. The method of claim 1, wherein retraining the image-query understanding model comprises:
determining the correlation between the target image area and the target phrase by obtaining an inner product between a first vector representing the target image area and a second vector representing the target phrase.

5. The method of claim 4, wherein retraining the image-query understanding model further comprises:
establishing multiple weights indicating an importance of projections of multiple vectors to each other, the multiple vectors including the first vector and the second vector.

6. The method of claim 1, wherein:
the robot comprises a cleaning robot; and
the image-query understanding model corresponds to operations of the cleaning robot.

7. The method of claim 6, wherein the retrained image-query understanding model is configured to be used by the cleaning robot in an inference mode that does not include use of a target phrase.

8. An electronic device for controlling a robot, the electronic device comprising:
at least one memory configured to store instructions; and
at least one processing device configured when executing the instructions to:
obtain an image-query understanding model;
obtain an image and a user query associated with the image, wherein the image comprises a target image area and the user query comprises a target phrase, and wherein the target image area is marked on the image by a user and the target phrase is identified within the user query by the user during operation of the robot; and
retrain the image-query understanding model using a correlation between the target image area and the target phrase to obtain a retrained image-query understanding model;
wherein, to retrain the image-query understanding model, the at least one processing device is configured to determine (i) one or more query-level contextual features, (ii) one or more question features, (iii) one or more image-level contextual features, and (iv) one or more post-processed image features based on at least one weighted attention function.

9. The electronic device of claim 8, wherein:
the at least one processing device is configured to execute a question contextual feature extraction (Q-CFE) module to determine the one or more query-level contextual features and the one or more question features; and
the at least one processing device is configured to execute an image contextual feature extraction (I-CFE) module to determine the one or more image-level contextual features and the one or more post-processed image features.

10. The electronic device of claim 9, wherein the at least one processing device is further configured to execute a weighted contextual feature question-image understanding (WCUQIU) module to process (i) the one or more query-level contextual features and the one or more question features from the Q-CFE module and (ii) the one or more image-level contextual features and the one or more post-processed image features from the I-CFE module.

11. The electronic device of claim 8, wherein, to retrain the image-query understanding model, the at least one processing device is configured to determine the correlation between the target image area and the target phrase by obtaining an inner product between a first vector representing the target image area and a second vector representing the target phrase.

12. The electronic device of claim 11, wherein, to retrain the image-query understanding model, the at least one processing device is further configured to establish multiple weights indicating an importance of projections of multiple vectors to each other, the multiple vectors including the first vector and the second vector.

13. The electronic device of claim 8, wherein:
the robot comprises a cleaning robot; and
the image-query understanding model corresponds to operations of the cleaning robot.

14. The electronic device of claim 13, wherein the retrained image-query understanding model is configured to be used by the cleaning robot in an inference mode that does not include use of a target phrase.

15. A non-transitory machine-readable medium containing instructions that when executed cause at least one processor of a robot to:
obtain an image-query understanding model;
obtain an image and a user query associated with the image, wherein the image comprises a target image area and the user query comprises a target phrase, and wherein the target image area is marked on the image by a user and the target phrase is identified within the user query by the user during operation of the robot; and
retrain the image-query understanding model using a correlation between the target image area and the target phrase to obtain a retrained image-query understanding model;
wherein the instructions that when executed cause the at least one processor to retrain the image-query understanding model comprise:
instructions that when executed cause the at least one processor to determine (i) one or more query-level contextual features, (ii) one or more question features, (iii) one or more image-level contextual features, and (iv) one or more post-processed image features based on at least one weighted attention function.

16. The non-transitory machine-readable medium of claim 15, wherein the image-query understanding model comprises:
  a question contextual feature extraction (Q-CFE) module configured to determine the one or more query-level contextual features and the one or more question features; and
  an image contextual feature extraction (I-CFE) module configured to the one or more image-level contextual features and the one or more post-processed image features.

17. The non-transitory machine-readable medium of claim 16, wherein the image-query understanding model further comprises a weighted contextual feature question-image understanding (WCUQIU) module configured to process (i) the one or more query-level contextual features and the one or more question features from the Q-CFE module and (ii) the one or more image-level contextual features and the one or more post-processed image features from the I-CFE module.

18. The non-transitory machine-readable medium of claim 15, wherein the instructions that when executed cause the at least one processor to retrain the image-query understanding model comprise:
  instructions that when executed cause the at least one processor to determine the correlation between the target image area and the target phrase by obtaining an inner product between a first vector representing the target image area and a second vector representing the target phrase.

19. The non-transitory machine-readable medium of claim 18, wherein the instructions that when executed cause the at least one processor to retrain the image-query understanding model comprise:
  instructions that when executed cause the at least one processor to establish multiple weights indicating an importance of projections of multiple vectors to each other, the multiple vectors including the first vector and the second vector.

20. The non-transitory machine-readable medium of claim 15, wherein:
  the robot comprises a cleaning robot; and
  the image-query understanding model corresponds to operations of the cleaning robot.

21. A method comprising:
  training, using at least one processor of a robot, an image-query understanding model based on a correlation between a target image area of a first image and a target phrase of a user query, wherein the target image area is marked on the first image by a user and the target phrase is identified within the user query by the user during operation of the robot;
  obtaining, using the at least one processor, a user instruction to perform an operation;
  obtaining, using the at least one processor, a second image showing a first area to perform the operation;
  determining, using the at least one processor and the trained image-query understanding model, a second area that is a subset of the first area based on the user instruction; and
  performing, using the robot, the operation for the second area according to the user instruction;
  wherein the image-query understanding model comprises (i) one or more query-level contextual features, (ii) one or more question features, (iii) one or more image-level contextual features, and (iv) one or more post-processed image features determined based on the target image area and the target phrase using weights learned during the training.

22. The method of claim 21, wherein the second area includes at least one feature that is different from a feature of the target image area of the first image.

23. The method of claim 22, wherein the image-query understanding model comprises:
  a question contextual feature extraction (Q-CFE) module associated with the one or more query-level contextual features and the one or more question features; and
  an image contextual feature extraction (I-CFE) module associated with the one or more image-level contextual features and the one or more post-processed image features.

24. The method of claim 23, wherein the image-query understanding model further comprises a weighted contextual feature question-image understanding (WCUQIU) module configured to process (i) the one or more query-level contextual features and the one or more question features from the Q-CFE module and (ii) the one or more image-level contextual features and the one or more post-processed image features from the I-CFE module.

25. The method of claim 21, wherein:
  the robot comprises a cleaning robot; and
  the operation comprises a cleaning operation.

* * * * *